May 20, 1969     J. R. ECKEL ET AL     3,445,085

FLUID ACTUATED CONTROL VALVE

Filed July 13, 1967

SECTION 2-2

John R. Eckel   INVENTORS
Alexander B Hildebrandt

BY *James A. Reilly*

ATTORNEY

United States Patent Office 3,445,085
Patented May 20, 1969

3,445,085
FLUID ACTUATED CONTROL VALVE
John R. Eckel, Houston, Tex., and Alexander B. Hildebrandt, Tulsa, Okla., assignors to Esso Production Research Company, a corporation of Delaware
Filed July 13, 1967, Ser. No. 653,151
Int. Cl. F16k 7/07
U.S. Cl. 251—5                                             4 Claims

ABSTRACT OF THE DISCLOSURE

A fluid-actuated control valve for handling high-pressure fluids which includes an elongated tubular mandrel containing lateral ports upstream and downstream of an internal barrier, a hard resilient sleeve surrounding the mandrel about the ports, and a valve body with smooth inner contours which is affixed to the mandrel adjacent the ends of the sleeve and contains a port for the introduction of a control fluid into the annular space between the sleeve and body.

BACKGROUND OF THE INVENTION

*Field of the invention*

This invention relates to fluid-actuated valves for controlling drilling muds and other fluids which are pumped at high pressures and contain suspended particulate matter in high concentrations.

*Description of the prior art*

Gates valves, globe valves, needle valves and similar devices employed for controlling fluid flow have serious limitations where fluids containing suspended solids in high concentrations must be handled at high pressures. Experience has shown that the solid particles tend to erode the valve seats and that proper control is difficult to maintain because of plugging by the particles. It has been suggested that these difficulties can be avoided by utilizing valves containing rubber sealing members which are longitudinally compressed to shut off fluid flow. Such valves avoid the erosion problem but nevertheless have certain disadvantages. It has been found that the deformation necessary to shut off flow causes rapid failure of the rubber members and that the service life of such valves is often short.

Other valves available in the past include the sleeve type valves provided with a rigid core on which a sleeve of soft vulcanized rubber of similarly resilient material is positioned within an annular chamber. The sleeve extends over ports on both sides of an internal barrier in the core and shuts off flow in response to pressure applied with a control fluid. These valves are generally unsatisfactory for use with drilling muds and similar solids-laden fluids handled at high pressures because of failure of the rubber sleeves due to extrusion of the soft rubber into the ports, rupture under internal pressure, and abrasion against the housing. As a result of these and other difficulties, no wholly satisfactory means for precisely controlling the flow of drilling muds and similar fluids has been available.

SUMMARY OF THE INVENTION

This invention provides an improved sleeve type valve which avoids many of the problems encountered heretofore. The improved valve includes an elongated tubular mandrel containing lateral inlet and outlet ports in the mandrel wall, a resilient sleeve with a hardness in excess of about 50 on the Type A Durometer scale which is mounted on the outer surface of the mandrel over the ports and held in place at each end, and a tubular housing which extends over and engages each end of the sleeve, increases in internal diameter to a maximum value at the center of the sleeve without any abrupt changes, and contains an inlet for the admission of control fluid into the space between the housing and the outer surface of the sleeve. Tests have shown that this structure permits precise control of the flow of drilling muds and other solids-laden fluids and that the improved valve is capable of operating for extended periods without failure of the resilient sleeve or other problems that have been encountered with valves available in the past.

DESCRIPTION OF THE PREFERRED EMBODIMENTS

Figure 1:
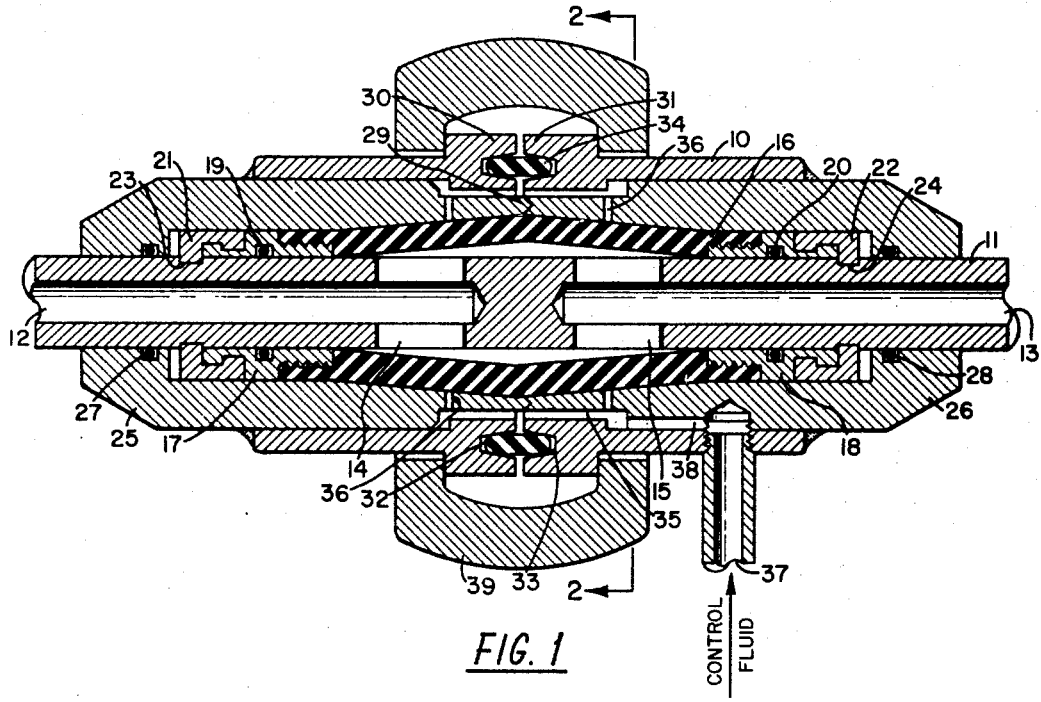
FIGURE 1 in the drawing is a cross-sectional elevation of the valve of the invention with the sleeve shown in its open position.

The valve shown in the drawing includes an elongated, tubular mandrel 11 of circular cross-section and substantially uniform outside diameter over its entire length. The mandrel contains inlet and outlet passageways 12 and 13 which extend longitudinally from the ends of the mandrel to points near the center thereof but do not intersect one another. Inlet ports 14 and outlet ports 15 extend laterally through the mandrel wall from passageways 12 and 13 respectively. The ports will normally be longitudinal slots having widths at least three times the maximum diameter of the particles contained in the fluid to be handled by the valve. It is preferred that the inlet ports and outlet ports be circumferentially staggered with respect to one another and that the total cross-sectional area of the inlet ports and that of the outlet ports be equal to or greater than the cross-sectional areas of the inlet and outlet passageways in order to reduce the pressure drop through the valve assembly. The mandrel shown contains twelve inlet ports and twelve outlet ports but a greater or lesser number may be provided if desired. The arrangement of the ports is shown more clearly in FIGURE 2 of the drawing.

Surrounding mandrel 11 is a resilient sleeve 16 of rubber, neoprene or similar material having a Type A Durometer hardness rating in excess of about 50. Tests have shown that soft sleeves fail rapidly and that a relatively hard material should therefore be used. The hardness value required for optimum performance will depend somewhat upon the width of the inlet and outlet ports but in general values above 50 will be satisfactory. Excellent results have been obtained with a sleeve having a Type A Durometer hardness of 70 on a valve with inlet and outlet ports one-eighth inch wide. The thickness of the sleeve will normally be between about one-eighth and about three-eighths of an inch. Sleeve 16 is connected at each end to annular retainers 17 and 18 containing seal rings 19 and 20 which prevent the escape of fluid between the sleeve and mandrel. As shown, the sleeve is threaded onto the retainers but it may be bonded in place without the threads if desired. The retainers are held in place by snap rings or similar members 21 and 22 which interlock with them and seat in annular grooves 23 and 24 in the outer surface of the mandrel. The spacing of the grooves should be such that the sleeve is held in slight tension and in the absence of fluid pressure contacts the mandrel surface along its entire length. FIGURE 1 in the drawing shows the sleeve in an expanded position under the influence of internal pressure.

The sleeve, retainers and snap rings are surrounded by a housing including an inlet section 25 and an outlet section 26 which engage one another near the longitudinal center of the mandrel and sleeve. Each housing section contains a circular opening at its outer end through which the mandrel extends. Seal rings 27 and 28, set in grooves in the housing, seal against the outer surface of the mandrel to prevent fluid leakage. Inwardly of the seal rings, the two sections fit closely over the snap rings, retainers and ends of the sleeve so that the sleeve is held in contact with the mandrel surface. The inner ends of the sections seat against one another in a tongue and groove joint 29 which prevents lateral movement of one section with respect to the other. The internal diameter of the housing is a maximum at this point and decreases on either side without any abrupt changes or sharp edges that might otherwise abrade the sleeve during operation of the valve.

The internal dimensions of the housing must be carefully controlled to secure proper operation of the valve and satisfactory sleeve service life. The inside diameter at points between the outer ends of the inlet and outlet ports 14 and 15 should be sufficient to provide an annular opening between the sleeve and mandrel, when the sleeve is in the expanded position shown in FIGURE 1, which has a cross-sectional area substantially equal to, but not more than about three times greater than, the individual cross-sectional areas of inlet and outlet passageways 12 and 13. If the internal diameter is too small at these points, the pressure drop through the assembly will be excessive and entrained solids will readily plug the valve. If the inside diameter is too large, on the other hand, the sleeve may tend to "balloon" at weak points, particularly where wear or abrasion may have taken place. Once this occurs, the elastic limit of the rubber or other resilient material may be exceeded and the sleeve will fail rapidly. Repeated deformation of the sleeve at stresses near the elastic limit will also promote rapid failure. The smooth inner contour of the housing supports the sleeve in the expanded position without pronounced localized deformation and thus results in much better sleeve life than can otherwise be obtained.

The two housing sections include outer flanges 30 and 31 which contain grooves 32 and 33 in their opposing faces. A resilient ring 34 of rubber or similar material extends into the two grooves to provide a seal capable of withstanding high pressures. An annular chamber 35 extends into the two housing sections below the flanges and communicates with the interior of the housing adjacent sleeve 16 through passageways 36. An inlet 37 and passageway 38 extending into the chamber are provided to permit the introduction of a control fluid from a source not shown. Although the flanges are welded in place in the assembly depicted in the drawing, they may be made integral parts of the two housing sections if desired.

Figure 2:
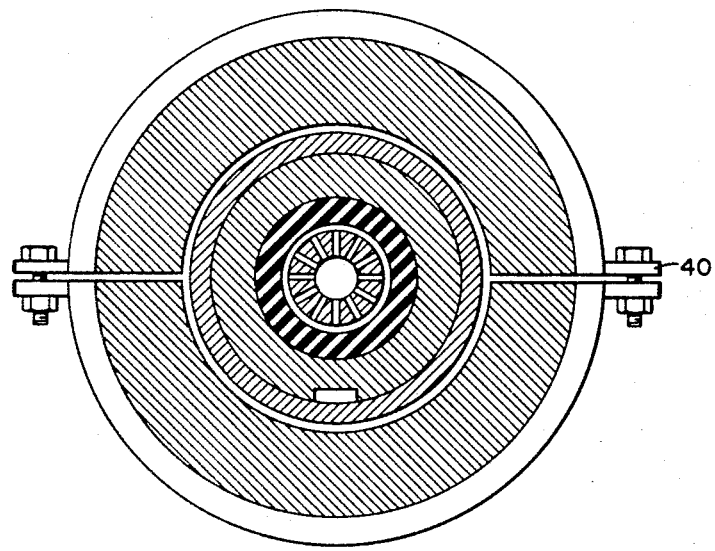
FIGURE 2 is a cross-section of the valve of FIGURE 1 taken about the line 2—2.

The housing is held together by a clamping ring 39 which engages flanges 30 and 31, compressing resilient ring 34 between them. The clamping ring, made in two sections, is secured by bolts or similar members extending through lugs 40 as shown in FIGURE 2. This permits rapid disassembly of the housing and access to the sleeve and ports in the mandrel without removing the mandrel from the flow line. Once the clamping ring has been released, the housing sections can be moved apart to expose the entire sleeve and the retainers and snap rings. If necessary, the snap rings can be disengaged from slots 22 and 23 and the entire sleeve assembly can be moved on the mandrel into a position such that inlet ports 14 and outlet ports 15 are exposed. To remove the sleeve, only one end of the mandrel need be disconnected. In the event that the ports become plugged and the accumulated solids prevent movement of the sleeve, the ports can be cleared by simply turning the valve end for end and reconnecting it in the line. Fluid flow will then quickly discharge the solids. Since the inlet and outlet sides of the valve are the same, it is unnecessary to reverse the assembly after it has been cleared. The ease with which the apparatus can thus be assembled, disassembled and cleared is an important advantage, particularly in handling drilling muds and similar fluids in which small particles may agglomerate and cause plugging problems.

During operation of the valve, the fluid to be controlled may be introduced into the assembly through either passageway 12 or passageway 13. In either case, pressure exerted against the inner surface of sleeve 16 forces the sleeve into the open position shown in the drawing so that fluid passes through ports 14 and 15. The contoured inner wall of the housing supports the sleeve in this position and prevents localized overstressing of the rubber. When it is desired to throttle or shut off flow, a control fluid is introduced through inlet 37 and passageway 38 into chamber 35. The pressure exerted on the outer surface of the sleeve by fluid passing through passageways 36 forces the sleeve inwardly toward the mandrel, reducing the annular space between the sleeve and mandrel. Depending upon the amount of pressure applied, this throttles or completely shuts off the flow. Since the pressure of the solids-free control fluid can be precisely controlled by an ordinary needle valve on the inlet line, precise control of the solids-laden fluid can be obtained.

Although the invention has been discussed in terms of controlling the flow of drilling muds and other solids-laden fluids, it will be apparent that the valve is not restricted to such applications and may instead be employed to control the flow of any liquid or gas and has advantages over other valves even though no entrained solids are present in the fluid.

What is claimed is:
1. A control valve comprising:
 (a) an elongated mandrel of substantially uniform outside diameter over its entire length, said mandrel including an inlet passageway extending longitudinally in one end thereof, an outlet passageway extending longitudinally in the other end thereof, a plurality of circumferentially-spaced inlet ports extending laterally from the outer surface of the mandrel to said inlet passageway near the inner end of said inlet passageway, and a plurality of circumferentially-spaced outlet ports extending laterally from the outer surface of the mandrel to said outlet passageway near the inner end of said outlet passageway;
 (b) a resilient sleeve having a Type A Durometer hardness in excess of about 50 concentrically disposed about said mandrel and secured at its ends to the outer surface thereof; and
 (c) a housing concentrically mounted on said mandrel over said resilient sleeve, said housing engaging the ends of said sleeve and having a smoothly contoured inner wall, said housing having sufficient internal volume to contain and support the sleeve in an expanded position with an annular space between the expanded sleeve and mandrel with a cross-sectional area equal to from about one to about three times the individual cross-sectional areas of said inlet and outlet passageways in the said mandrel, and said housing containing an inlet extending into said housing at a point adjacent the outer surface of said sleeve.

2. A valve as defined by claim 1 wherein said resilient sleeve member is neoprene having a Type A Durometer hardness of approximately 70.

3. A valve as claimed by claim 2 wherein said inlet and discharge ports in said mandrel are slots having a width of approximately 1/8".

4. A valve as defined by claim 1 wherein said housing comprises two intermeshing cylindrical members concentrically disposed about said mandrel and a clamping ring concentrically disposed about the cylindrical members for securing the members in abutting relationship.

References Cited

UNITED STATES PATENTS

| | | | |
|---|---|---|---|
| 3,236,496 | 2/1966 | Rosenstein | 251—368 XR |
| 3,371,677 | 3/1968 | Connolly | 251—5 XR |

HAROLD W. WEAKLEY, *Primary Examiner.*

U.S. Cl. X.R.

251—148, 368